June 10, 1958 F. KOVAC 2,837,983
CONTAINER MANUFACTURING PROCESS AND APPARATUS
Filed Feb. 23, 1956 9 Sheets-Sheet 1

Inventor:
Ferdinand Kovac
By: Michael S. Striker
agt.

Fig. 2

June 10, 1958 F. KOVAC 2,837,983
CONTAINER MANUFACTURING PROCESS AND APPARATUS
Filed Feb. 23, 1956 9 Sheets-Sheet 3

Fig. 3

Inventor:
Ferdinand Kovac
By: Michael S. Striker
agt.

Inventor.
Ferdinand Kovac
By: Michael S. Striker
agt.

June 10, 1958  F. KOVAC  2,837,983
CONTAINER MANUFACTURING PROCESS AND APPARATUS
Filed Feb. 23, 1956  9 Sheets-Sheet 5

Fig. 8

Inventor:
Ferdinand Kovac
By: Michael S. Striker
   agt.

June 10, 1958  F. KOVAC  2,837,983
CONTAINER MANUFACTURING PROCESS AND APPARATUS
Filed Feb. 23, 1956  9 Sheets-Sheet 6

Inventor:
Ferdinand Kovac.
By: Michael S. Striker
agt.

June 10, 1958  F. KOVAC  2,837,983
CONTAINER MANUFACTURING PROCESS AND APPARATUS
Filed Feb. 23, 1956  9 Sheets-Sheet 8

Inventor:
Ferdinand Kovac
By: Michael S. Striker
agt.

June 10, 1958     F. KOVAC     2,837,983
CONTAINER MANUFACTURING PROCESS AND APPARATUS
Filed Feb. 23, 1956     9 Sheets-Sheet 9

Inventor:
Ferdinand Kovac
By: Michael S. Striker
agt.

United States Patent Office 2,837,983
Patented June 10, 1958

2,837,983

CONTAINER MANUFACTURING PROCESS AND APPARATUS

Ferdinand Kovac, deceased, late of Hannover, Germany, by Alexandra Kovac, legal representative, Linz (Danube), Austria Application February 23, 1956, Serial No. 567,406

Claims priority, application Germany September 27, 1954

17 Claims. (Cl. 93—44.1)

The present invention relates to an apparatus and a process for manufacturing containers from a strip of sheet material.

More particularly, the present invention relates to a process and apparatus for manufacturing containers which are open at one end from a strip of sheet material. Such containers may be used to enclose any desired material such as foodstuffs, for example.

One of the objects of the present invention is to provide a process according to which containers of a desired configuration are continuously manufactured one after the other from a strip of sheet material.

Another object of the present invention is to provide an apparatus capable of continuously manufacturing containers from a strip of sheet material.

A further object of the present invention is to provide an apparatus capable of accomplishing all steps in the process of manufacturing containers of the above type while the apparatus turns continuously about a given axis and during one revolution of the apparatus.

An additional object of the present invention is to provide an apparatus of the above type where all of the parts are automatically controlled to carry out the desired operations in a given sequence for predetermined periods of time.

Still another object of the present invention is to provide an apparatus capable of accurately manufacturing containers of a predetermined size within given tolerances.

Also, it is an object of the present invention to provide an apparatus capable of accomplishing all of the above objects and at the same time characterized by extreme compactness, great simplicity, and great reliability in operation.

With the above objects in view the present invention mainly consists of a process and apparatus according to which a plurality of folding members are moved in a given sequence into and out of a plurality of folding chambers arranged at the periphery of a wheel which is supported for turning movement about its axis. The folding members press portions cut from a strip of sheet material into folding chambers so that the sheet material portions become folded about the folding members, and folding blocks are provided to join together free side edges of the sheet material portions to form the latter into containers carried by the folding members. Thereafter the folding members are moved out of the folding chambers and the containers are stripped from the folding members with suitable stripper arms. All of the above elements are controlled by cams and suitable motion transmission means so as to be actuated in the proper sequence and for the necessary lengths of time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
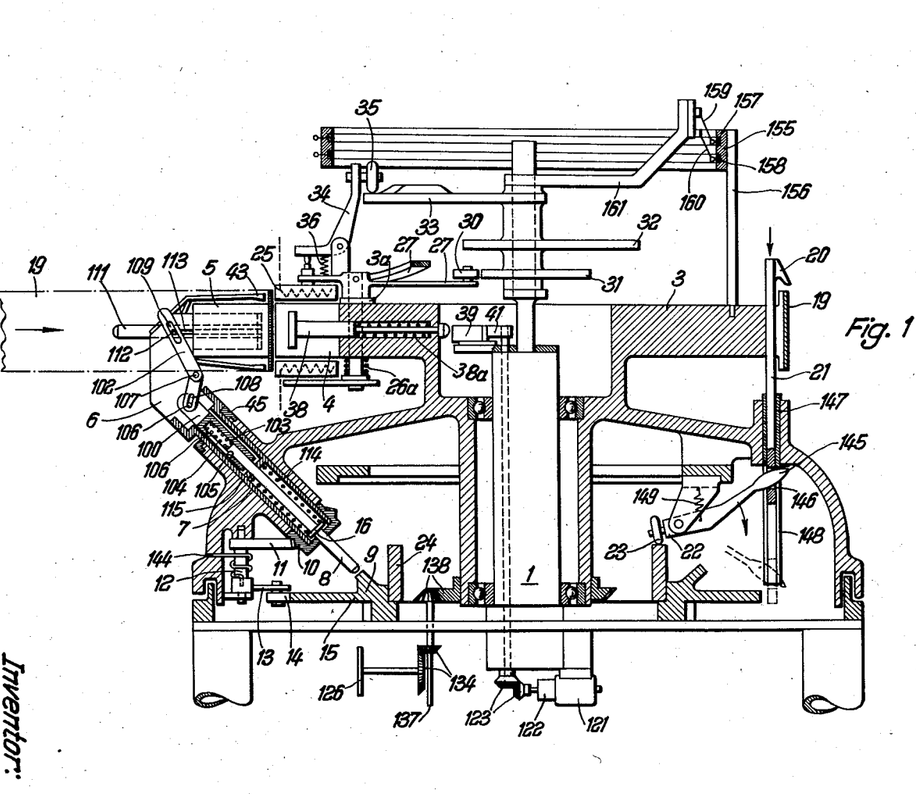
Fig. 1 is a fragmentary, partly sectional, partly schematic elevational view of an apparatus according to the present invention, the section of Fig. 1 being taken along a vertical plane passing centrally through the apparatus.

Referring now to the drawings, Fig. 1 fragmentarily illustrates the upper portion of a frame which carries the entire apparatus and forms part of the support means for the structure of the invention. A post 1 is fixed to and extends upwardly from the stationary frame, this post 1 being substantially vertical and remaining stationary together with the frame. In accordance with the present invention a means which forms a plurality of folding chambers is turnably supported by the post 1 which forms part of the support means. This means which forms a plurality of folding chambers is a wheel 3 having an annular skirt portion 2 fixed to and extending downwardly therefrom. As is evident from Fig. 1, suitable ball bearings are provided to turnably support the wheel 3 and the annular member 2 for movement as a unit about the post 1. The folding chambers 4 are formed by cutouts in the periphery of the wheel 3 extending radially toward the axis of the wheel 3 and equidistantly distributed about this axis, as is evident from Figs. 2 and 3. The folding chambers are of a substantially rectangular cross section and are open at the outer periphery of the wheel 3 as well as at the top and bottom faces of the wheel 3 so that each folding chamber is defined by a pair of parallel planar surfaces and an end surface interconnecting the parallel surfaces.

With the process and apparatus of the present invention, folding members respectively cooperate with the folding chambers to participate in the manufacture of the containers, and according to the present invention there are as many folding members as there are folding chambers and each folding member cooperates at all times with only one folding chamber so that by proper adjustment of the structure great uniformity in the containers can be obtained. The folding members 5 are respectively located adjacent the folding chambers 4 for movement into and out of the same, and each folding member 5 has the shape, substantially, of a hollow rectangular cube which is open at one end. The folding members 5 have such a size that they substantially fill the folding chambers 4 when fully inserted into the same. Each folding member 5 is carried by a carrier means which includes a member 6 having, in the position shown in Fig. 1, a vertical arm from which extends a horizontal arm which enters into and slidably supports with relatively small clearance the folding member 5. This horizontal arm of member 6 extends to the right from its vertical arm, as viewed in Fig. 1, and the member 6 further includes an arm inclined downwardly to the right, as viewed in Fig. 1, and extending from the bottom end of the vertical arm of the member 6. A hollow tube 7 is fixed to and forms an extension of the inclined arm of each member 6 and extends downwardly to the right from the member 6, as viewed in Fig. 1, this tube 7 having a circular cross section. The annular skirt portion 2 is formed with a plurality of bored extensions in which the tubes 7 are supported for respective turning movement about their axes, these tubes 7 being restrained against axial movement in a manner described below. In accordance with the present invention, the tubes 7 of the plurality of carrier means for the folding members 5 respectively have axes which are inclined approximately 45° to the axis of the post 1.

A control means is provided to move the folding members 5 respectively into and out of the folding chambers 4, and this means includes a plurality of push rods 8 which respectively extend into the tubes 7 and are axially shiftable in the latter. Each push rod 8 extends slidably through a central opening formed in a wall 115 fixed to and extending transversely across the interior of each tube 7, and each push rod 8 has a collar 16 fixed thereto and located within the tube 7. A coil spring 114 is coiled about each push rod 8, bears with one end against wall 115, and bears with its opposite end against the collar 16 to urge the push rod 8 downwardly to the right, as viewed in Fig. 1. In this way the push rods 8 are maintained in engagement with an annular cam 9 coaxial with the post 1 and fixedly carried by the frame, this cam 9 forming part of the means for moving the folding members 5 and having a shape which causes the push rods 8 to shift axially during rotation of elements 2 and 3 to produce the desired movement of the folding members 5. It will be noted that the cam 9 is located within and covered by the annular skirt member 2 which thus forms a housing for the cam 9.

Each rod 8 extends at its upper end portion into a hollow rod extension 100 which forms an extension of the rod 8 and which is shaped at its side not visible in Fig. 1 so as to clear the member 6 during axial shifting of rod 8 and its extension 100. The hollow rod extension 100 is formed with an axial slot 106 into which a pin 105 fixed to and extending radially from the rod 8 extends so that elements 8 and 100 cannot turn with respect to each other but nevertheless are free to move axially with respect to each other. In the inner space 103 of the rod extension 100 is located a spring 104 which bears at one end against the upper end of rod 8 and at its opposite end against the end of the bore in the extension 100 to urge the parts 8 and 100 away from each other until the pin 105 engages the bottom end of slot 106, as shown in Fig. 1.

Each rod extension 100 fixedly carries a pin 110 which extends into an elongated slot 108 formed in an arm 101 of a bell crank 101, 102 which is pivotally carried at 107 by the member 6. The arm 102 of the bell crank is formed with an elongated slot 109 into which extends a pin 112 fixed to and extending radially from a rod 111 which is slidable in a bore formed in the upper horizontal arm of member 6 and which is fixed at its right end, as viewed in Fig. 1, to the inner face of the end wall of the folding member 5, member 6 being formed with an elongated slot 113 through which the pin 112 extends. Thus, as the rod 8 is shifted upwardly to the left from the position shown in Fig. 1 it will act through spring 104 to shift extension 100 also upwardly to the left, and this will result in turning of bell crank 101, 102 in a clockwise direction about pivot 107 so as to shift rod 111 and folding member 5 therewith to the right, as viewed in Fig. 1, so that in this way the folding member 5 enters into the folding chamber 4. When the push rod 8 moves along a lower part of the stationary cam 9 during rotation of elements 2 and 3 the spring 114 and spring 104 as well as push rod 8 and rod extension 100 automatically return folding member 5 to its rest position out of a folding chamber 4.

Another control means is provided to automatically turn, at a given time, the folding members 5 with the completed containers thereon in succession from the horizontal position they have when they move out of the folding chambers 4 to a vertical position indicated in Fig. 15, the completed containers being removed in a manner described below from the folding members 5 when the latter are in this vertical position. The control means which produces the movement of folding members 5 from their horizontal to their vertical position and back again includes a bevel gear 10 fixed to and closing the lower end of each tube 7, this bevel gear having an end wall formed with an opening through which push rod 8 extends, as indicated in Fig. 1. It will be noted that the bevel gear 10 has an upper end face engaging the lower face of the extension of skirt member 2 which slidably supports tube 7, so that bevel gear 10 also prevents axial shifting of tube 7 in an upward direction. Axial shifting of tube 7 in a downward direction is brought about by engagement between a shoulder of tube 7 and an upper face of a cam 45 fixed to the upper end of each extension of skirt member 2. Cam 45 is annular and extends about the tube 7 in the manner indicated in Fig. 1, this cam 45 in addition to preventing downward axial shifting of tube 7 serving a function described below.

Each bevel gear 10 meshes with a gear sector 11 which is fixed to a shaft 12 which is parallel to post 1 and is supported for turning movement about its own axis by the skirt member 2 in the manner indicated in Fig. 1. A wire spring 144 engages skirt member 2, is coiled about a shaft 12, and is connected to the latter to resiliently urge shaft 12 to turn in one direction about its axis. An arm 13 is fixed to and extends radially from the shaft 12 and turnably carries a cam follower roller 14 which engages an annular cam 15 formed integrally with the cam 9. Thus, the spring 144 guarantees that the follower 14 will remain at all times in engagement with cam 15, and this cam 15 is so shaped that during a predetermined part of each revolution of elements 2 and 3 the shaft 12 will be turned to turn the gear sector 11 and thus turn the bevel gear 10 to turn the folding member 5 through the carrier means which carries the same from the horizontal position clearly shown in Fig. 15 in dotted lines through approximately 180° to the vertical position shown in solid lines in Fig. 15 and then back again to the dotted line position. Parts 5 and 6 are shown diagrammatically in Fig. 3 in dot-dash lines with part 5 located between its vertical and horizontal positions and turning downwardly toward its vertical position.

Figure 2:
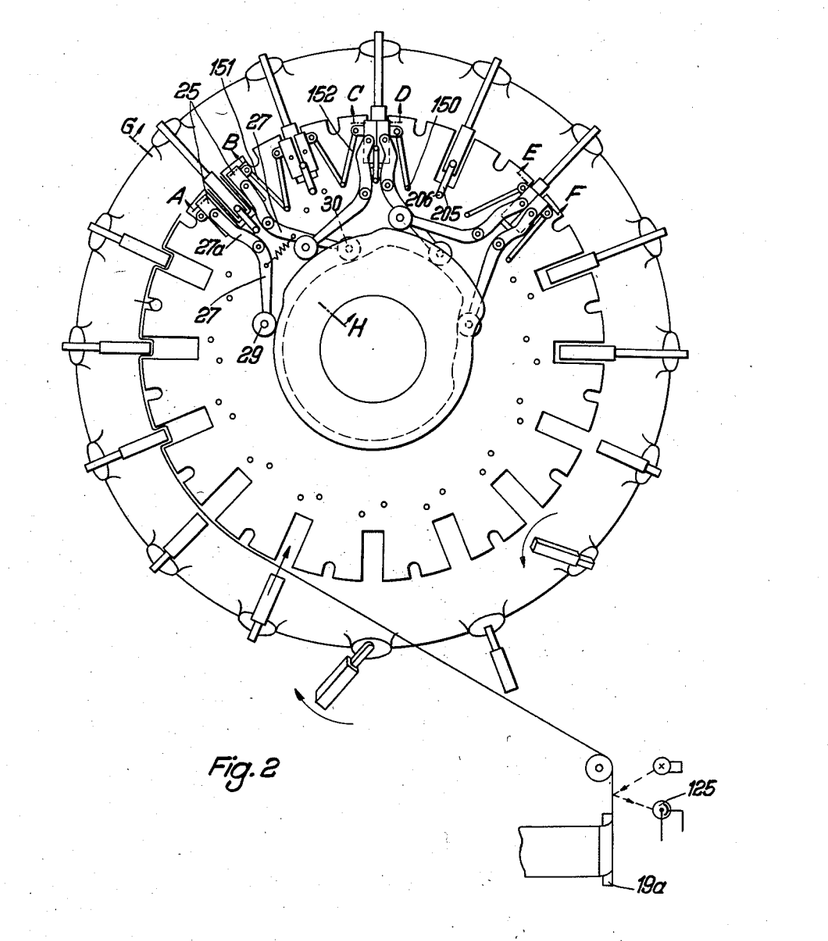
Fig. 2 is a fragmentary top plan view of the structure of Fig. 1, the electrical structure at the very top of Fig. 1 and the topmost cam of Fig. 1 being omitted from Fig. 2 to show clearly the structure beneath these latter elements.
Figure 3:
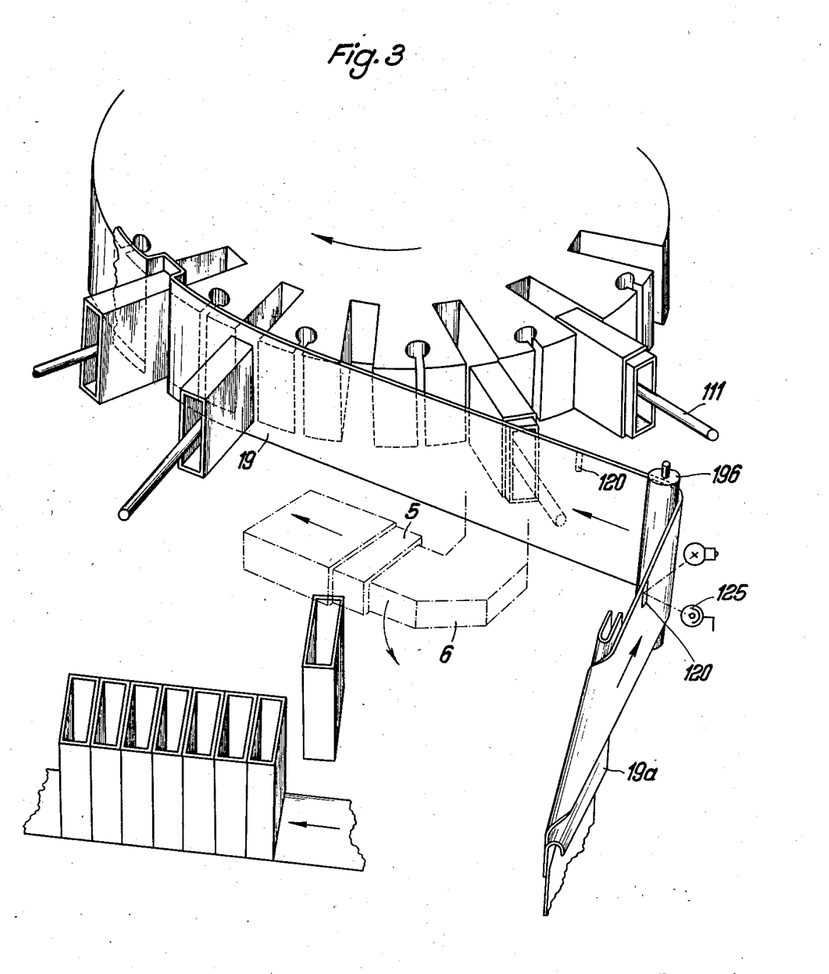
Fig. 3 is a fragmentary perspective view illustrating the manner in which the strip of sheet material is fed to the apparatus and the manner in which the completed containers are carried away from the apparatus.
Figure 11:
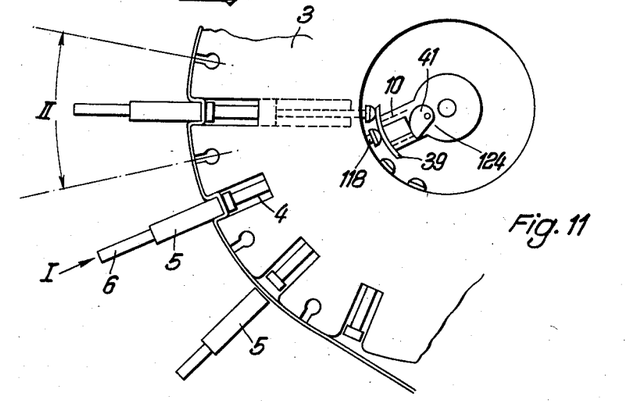
Fig. 11 is a fragmentary plan view similar to Fig. 2 illustrating successive stages in the manufacture of a container according to the invention.

The containers manufactured according to the process and apparatus of the present invention are made from a strip 19, which may, for example, be paper of a suitable quality, and the strip 19 moves upwardly from any suitable roll, as indicated in Fig. 3, to be turned by guide 19a so as to advance in a horizontal direction around the guide roller 19b, supported for turning movement by any suitable structure (not shown), and advance to the outer periphery of the wheel 3 which it contacts tangentially, as indicated in Figs. 3 and 11. As is evident from Fig. 2, the folding members 5 are in their downwardly extending vertical position at the area where the strip 19 approaches the wheel 3 so that the folding members 5 can freely pass beneath the strip 19, and by the time the folding members 5 have returned to their upper, horizontal position the strip 19 has engaged the outer periphery of the wheel 3 and is located between the folding chambers 4 and the folding members 5. This operation is clearly illustrated in Fig. 2.

In a manner which is described in greater detail below in connection with the operation of the structure of the invention, the strip 19 is gripped between folding members 5 and wheel 3 when the folding members 5 start to enter into the folding chambers 4, and while the strip 19 is thus gripped it is cut, by a cutting means now to be described, into portions which are thereafter automatically folded and formed into the containers which are the final product of the process and apparatus of the present invention. This cutting means takes the form of a plurality of cutting blades 20 one of which is shown in Fig. 1. A cutting blade 20 is arranged between each pair of successive folding chambers 4, as is evident from Fig. 11. As is shown in Fig. 1, each cutting blade 20 is fixed to the top end of a rod 21 which is guided for shifting movement along its axis in a bore formed in wheel 3 between each pair of successive chambers 4, this bore being parallel to the axis of wheel 3 so that each rod 21 is parallel to this axis. The wheel 3 is also formed with an axially extending slot communicating with each of these bores and extending to the outer face at the periphery of wheel 3 to provide a free space through which blade 20 may pass. As is evident from Fig. 1, the skirt member 2 is formed with a plurality of vertical projections which are vertically bored and which carry tubular guides 147, respectively, through which the rods 21 respectively extend to be guided in this way for axial shifting movement. Each rod 21 is formed with a cutout 146 into which an elliptically-shaped end portion 145 of a lever 22 extends, and the tubular guide 147 is formed with opposed slots 148 through which elliptical end portion 145 also passes so that when the lever 22 turns the rod 21 will be axially shifted to move the cutting blade 20 with respect to the strip 19, and at the same time the cooperation of part 145 with rod 21 prevents the latter from turning about its axis. Each lever 22 is supported, from lugs extending from a ring fixedly carried by and located within the skirt member 2, for turning movement about a horizontal axis, as indicated in Fig. 1, and a spring 149 is connected at one end to each lever 22 and at its opposite end to a part of the lugs carrying the lever to urge each lever 22 to turn in a counterclockwise direction, as viewed in Fig. 1. Each lever 22 turnably carries at its inner end a cam follower roller 23 which engages the top camming face of an annular cam 24 fixed to the cam 9 and thus also covered by the skirt member 2. The cam 24 has a camming surface which is shaped to cause the cutting blades 20 to cut the strip 19 at the desired times during each rotation of elements 2 and 3, as will be apparent from the description which follows.

The strip 19 has a width greater than the thickness of the wheel 3 and has free edge portions of substantially equal widths which extend beyond the top and bottom faces of the wheel 3 to provide the strip with portions 42 shown in Fig. 4 which are adapted to be acted upon by blocks 25 and 26 in a manner described below in order to fold the several strip portions in the manner shown in Figs. 4–7 and described below. As is most clearly evident from Fig. 2, a pair of blocks 25 are located at opposite sides of each chamber 4 adjacent the top face of wheel 3, and a pair of blocks 26 are respectively located beneath each pair of blocks 25, one of the blocks 26 being shown in Figs. 1 and 12. Each block 25 adjacent one side of the chamber 4 is carried by a lever 27 for turning movement about a vertical axis with respect to lever 27, and the other block 25 at the other side of chamber 4 is carried by a lever 27', in the same way as the block connected to lever 27. A pair of levers 27 and 27' are provided for each chamber 4, and each lever 27 and 27' is fixed to the top end of a shaft which extends turnably through a vertical bore in the wheel 3, as shown in Fig. 12. This shaft can turn about its axis and can also shift axially with respect to the wheel 3. A plate is fixed to and extends radially from the bottom end of each of these shafts and turnably carries a block 26 adjacent the bottom face of wheel 3, the blocks 26 being at all times located respectively beneath the blocks 25. A pair of links 151 and 152 are pivotally connected together, as shown in Fig. 2, and each link 151 is pivotally connected to a block 25 adjacent one chamber 4 while each link 152 is pivotally connected to the block 25 adjacent the next chamber 4, these links serving to maintain the blocks parallel to the side surfaces of the chambers 4 during turning of the levers 27 and 27'. Links identical with links 151 and 152 are interconnected in an identical manner with the blocks 26 beneath the wheel 3. Each lever 27 turnably carries at its inner end a cam follower roller 29 and each lever 27' turnably carries at its inner end a cam follower roller 30. The followers 29 ride along the outer peripheral camming face of a cam 32 and the followers 30 ride along the outer peripheral camming face of a cam 31, located beneath the cam 32 (Figs. 1 and 2). The post 1 has a portion integral therewith extending upwardly beyond the wheel 3 and fixedly carrying the cams 31 and 32. Thus, as the wheel 3 turns the followers 29 and 30 respectively cooperate with the stationary cams 32 and 31 to turn the pairs of cooperating blocks 25 and 26 toward and away from each other in a given manner described below in connection with Figs. 4–7. A spring 27a (Fig. 2) is connected to each pair of levers 27 and 27' to urge the followers 29 and 30 against the cams 32 and 31, respectively, so that these followers are always in engagement with the cams.

Figure 31:
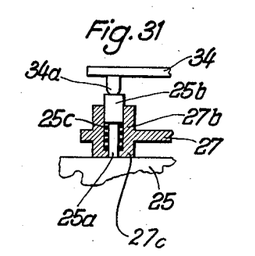
Fig. 31 is a fragmentary, partly sectional, elevational view illustrating the manner in which the folding blocks are connected to the levers which actuate the same.

Each of the levers 27 and 27' is pivotally connected to a bell crank 34 (Fig. 12) so that the bell crank 34 can turn about a horizontal axis with respect to lever 27, and each bell crank 34 turnably carries adjacent its top end a cam follower roller 35. The wheel 3 is formed with upwardly extending bosses 3a (Fig. 1) whose top faces engage the bottom faces of levers 27 and 27' where the latter are fixed to the shafts extending through the wheel 3, and a spring 36 is located between each lever 27, 27' and the bell crank 34 pivotally connected thereto and abuts against the horizontal arm of the latter and lever 27 and 27' to tend to turn the bell crank 34 in a clockwise direction, as viewed in Figs. 1 and 12 so that in this way the follower 35 is maintained in engagement with the cam 33 also fixed to the extension of post 1 which is located above the wheel 3. The cam 33 extends only partly about the axis of post 1 and the followers 35 ride onto and off from the cam 33 during turning of the wheel 3. The connection of the blocks 25 to the levers 27 includes a spring arrangement illustrated in Fig. 31 which enables the blocks 25 to move downwardly with respect to levers 27 and 27' and these levers to move upwardly with respect to the blocks. Thus, each block 25 has a pin 25a fixed to and extending upwardly therefrom and passing freely through and beyond a tube 27b fixed to each lever 27 and 27'. This tube has an inwardly extending bottom annular flange 27c engaging the bottom end of a coil spring 25c coiled about the pin 25a and engaging a flange 25b fixed to this pin adjacent the top end thereof. Thus, these coil springs maintain the blocks 25 in a position slightly raised from the top face of wheel 3, as is evident from Figs. 1 and 12. Each bell crank 34 is provided with a projection 34a engaging the top end of each pin 25a and extending downwardly from the horizontal arm of each bell crank 34. Thus, when each bell crank 34 turns from the position of Fig. 12 to that of Fig. 13, as a result of cooperation between cam 33 and follower 35, the blocks 25 will first be moved downwardly toward the plate 3 and then the continued turning of the bell cranks after blocks 25 can no longer move downwardly will result in raising of the levers 27 and 27' slightly through a distance sufficient to move the blocks 26 upwardly toward the wheel 3, this operation being clearly shown in Fig. 13. A spring 26a coiled about the bottom end portion of each shaft connected to levers 27 and 27' and engaging the bottom face of wheel 3 and a plate carrying block 26 urges the parts back to their rest position indicated in Fig. 12.

Blocks 25 and 26 are provided with electrical heating elements which are connected electrically to the electrically conductive slip rings 157 and 158 in an unillustrated manner. These slip rings, as is apparent from Fig. 1, are carried by a ring 155 of electrically non-conductive material, and this ring 155 is supported by posts 156 carried by and extending upwardly from the wheel 3 so that the ring 155 turns with the wheel 3. A source of electricity is connected in any suitable manner to the springy electrical contacts 159 and 160 which respectively engage the slip rings 157 and 158, these springy contacts being carried by an electrically non-conductive plate fixed to an arm 161 which is in turn fixedly carried by an upper portion of the stationary post 1. It will be noted from Fig. 1 that the arm 161 extends high enough to locate the lower end portions of the contacts 159 and 160 at a higher elevation than the followers 35 so that the latter move freely about the axis of post 1.

Figure 8:
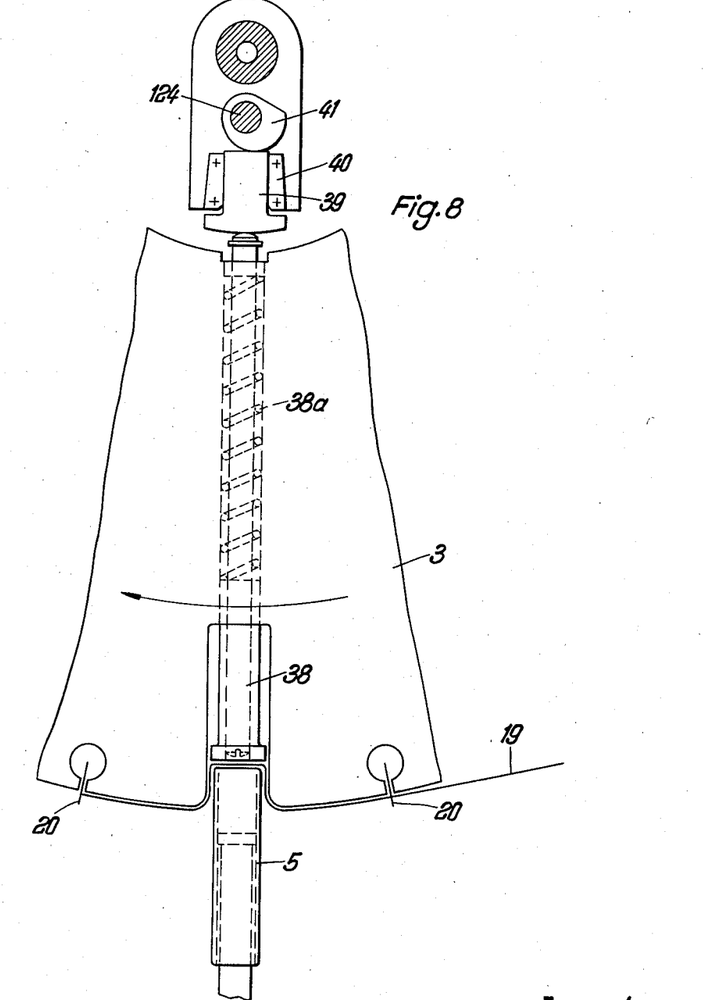
Fig. 8 is a fragmentary plan view illustrating a structure for temporarily limiting the extent to which the folding members enter into the folding chambers.

In accordance with the present invention a means is provided to limit temporarily the extent to which the folding members 5 first enter into the folding chambers 4. This means includes a rod 38 extending into each chamber 4 through the end face thereof and guided in a suitable bore in wheel 3 in the manner shown most clearly in Figs. 1 and 8. Thus a, spring 38a in each of these latter radial bores of the wheel 3 engages a shoulder of each rod 38, is coiled about a portion of the latter, and engages an inner wall portion of wheel 3 through which the rod 38 passes to the free space between wheel 3 and post 1, so that this spring urges rod 38 outwardly away from the post 1, such movement being limited by engagement between a nut or the like fixed to each inner end of rod 38 in the inner space of wheel 3 and engaging the latter. The springs 104 are stronger than the springs 38a so that when the push rods 8 are shifted to move the folding members 5 into the folding chambers 4, the springs 38a will be compressed and will not be capable of preventing movement of folding members 5 into the folding chambers 4. As is shown in Figs. 1, 8, and 11, an element 39 is provided to block inward movement of rods 38 when their inner ends are located opposite element 39, as indicated in Figs. 8 and 11. Element 39 is carried by a plate which is fixed to the post 1 and extends radially therefrom in a plane normal to the post 1, and this plate is formed with guides which engage opposed side edges of element 39 to guide the latter for radial movement toward and away from the axis of the post 1. The guides 40 for guiding stop member 39 are shown in Figs. 8 and 11. A cam 41 engages the inner end of member 39 to determine the position thereof, and this cam 41 is fixed to the top end of a shaft 124 which extends through a suitable bore of post 1 to be turnably guided thereby. Thus, when the shaft 124 is turned in one direction or the other about its axis through a relatively small angle the position of stop member 39 will be adjusted, and this stop member 39 will be maintained in engagement with the cam 41 by the rods 38 themselves which are pushed toward the stop member 39 by the folding members 5, as will be described below.

The cam 41 has its angular position automatically adjusted, and this automatic adjustment takes place through a bevel gear 123 fixed to the bottom end of shaft 124 and meshing with another bevel gear 123 driven through gearing 122 by a motor 121 connected to any source of electricity. The motor 121 is automatically operated by a photoelectric control arrangement which cooperates with markings 120 on the strip 19 (Fig. 3), and the circuit for photoelectrically controlling motor 121 is indicated in Fig. 16. The strip 19 should be cut where the markings 120 are located, and during operation there may be a tendency for the markings 120 to become located on one or the other side of the cutting blades 20, and this undesirable result is prevented through adjustment of cam 41. As is indicated in Figs. 2 and 3 a lamp and photocell 125 are provided to receive impulses from the markings 120, and these impulses are electronically amplified and transmitted to the adjusting motor 121 which operates to adjust the position of the cam 41. The markings 120 may be properly aligned with the blades 20 when the operations are started, but then during the further operations it may happen, for example, that the lengths cut from the strip 19 tend to become shorter and shorter. In order to avoid such an undesirable result the impulses received by the photocell 125 are transmitted to the adjusting motor 121 through a control apparatus which includes a control disc 126 (Fig. 16). This control disc 126 is continuously rotated during operation by a pair of bevel gears 134 (Fig. 1) one of which is driven from a pair of bevel gears 138, one of the bevel gears 138 and one of the bevel gears 134 being fixedly carried by a shaft 137 supported for rotation about its axis in any suitable way. The larger bevel gear 138 is in the form of a ring fixed to the inner tubular portion of skirt member 2, as shown in Fig. 1, and the larger bevel gear 134 is carried by a shaft fixed to the disc 126 and supported by any suitable bearings (not shown) for rotation about its axis.

The control disc 126 is made up of two substantially semi-circular sections 127 and 128 which are electrically insulated from each other. In the plane 129 which separates segments 127 and 128 from each other is located a block 130 of electrically non-conductive material, this block being situated at the outer periphery of the disc 126. The impulses received by photocell 125 are amplified in the electronic amplifier 131 and transmitted to the contact 132 which engages the outer periphery of the disc 126. A pair of additional contacts 132 and 133 respectively engage opposed parts of the periphery of control disc 126 and are respectively connected electrically to the relays 141 and 140 which control the phase connection of motor 121 to control the direction in which the latter rotates. The transmission which rotates the disc 126 is so chosen that when the insulating block 130 is at the topmost part of its travel and engages the contact 132 the blades 20 are in a predetermined position and begin cutting the strip 19. In this latter position of the blades 20 the markings 120 of strip 19 should intercept the light beam travelling to the photocell 125. If this condition does not obtain, that is if the insulating block 130 is located to one side of the contact 132 when the blades 20 are in their predetermined position, then the contact 132 will engage the segment 127, for example, at this time and when the marking 120 passes through the light beam an electrical impulse is transmitted to the relay 140 which interconnects two phases of the adjusting motor 121 and the latter operates to adjust the cam 41 correspondingly. The adjustment is such that the lengths of the portions cut from the strip 19 differ from each other in a step-wise manner within predetermined limits. If at the predetermined position of blades 20 the contact 132 engages segment 128, then the relay 141 is energized to interconnect phases of motor 121 which turn the latter in a reverse direction. The relays are interconnected in such a way that only one relay can operate at one time.

The structure of the present invention also includes a means for stripping from the folding members 5 the completed containers which are located thereon. This stripping means is illustrated in Figs. 1, 13a, 14 and 15. The stripping means includes a pair of leaf springs 43 and 44, the leaf spring 43 being fixed directly to part 6 of the carrier of each folding member 5 and the leaf spring 44 being fixed to a lever 49 turnably carried by each member 6 in a suitable cutout thereof, the leaf spring 44 extending from the lever 49 to the exterior of member 6 through an opening formed in the latter and communicating with the space in which lever 49 is located. The lever 49 is pivotally carried by a pivot pin 47. In the position of the parts shown in Figs. 13a the leaf spring 43 which extends over the folding members 5 bears against a rod 48 which extends slidably through a suitable bore in member 6 and engages lever 49 to tend to turn the lever 49 in a counterclockwise direction, as viewed in Fig. 13a. Such turning movement of the lever 49 is prevented by a member 46 which engages the lever 49 at one end of member 46 and which engages the cam 45 with its opposite end, member 46 extending slidably through a suitable bore in members 6 and 7 to engage the cam 45. As is clearly shown in Fig. 1 the lower side of cam 45 is spaced at its upper face from the shoulder of member 7 while the upper side of the upper face of cam 45 engages this shoulder. Thus, in the position of the parts shown in Fig. 1 the stripping means which is now in its idle position will have the position shown in Fig. 1 where the stripper members 43 and 44 are spaced from the folding member 5. When the member 6 is turned about the axis of tube 7 through 180° with the structure described above the bottom end of member 46 will become located opposite the lower part of the upper face of cam 45 which is spaced by a distance indicated at 153 in Fig. 14 from the shoulder of tube 7. Thus, when the member 6 is thus turned to locate folding member 5 in position A of Fig. 15 the lever 49 will have turned to the position shown in Fig. 14 since the member 46 can now shift downwardly to free the lever 49 to the influence of leaf spring 43 which acts through rod 48 on lever 49. Thus, the leaf springs 43 and 44 will become located against and will press lightly on the container 154 shown in Fig. 14. With the elements 5 and 6 in position A of Fig. 14 the cam 9 actuates push rod 8 to shift the folding member 5 to the position A of Fig. 15 and the stripper members snap in front of the edge of the container. The further movement of push rod 8 with respect to cam 9 raises the member 5 through the above-described linkage successively to positions B and C of Fig. 15 and since the container is prevented by the stripper members 43 and 44 from moving with folding member 5 to positions B and C of Fig. 15 the container is stripped from the folding member 5 and falls onto a conveyer belt, as indicated in Fig. 3. The member 6 is then turned back to the dotted line position shown in Fig. 15.

Figure 21:
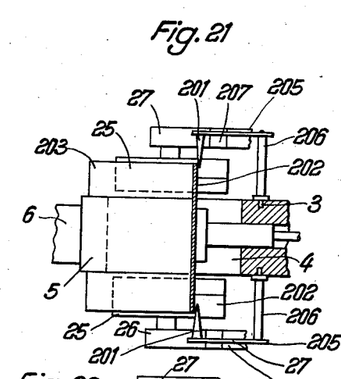
Fig. 21 is a fragmentary, partly sectional, elevational view showing parts of the apparatus in the position they take when a container is in the condition illustrated in Fig. 17.
Figure 22:
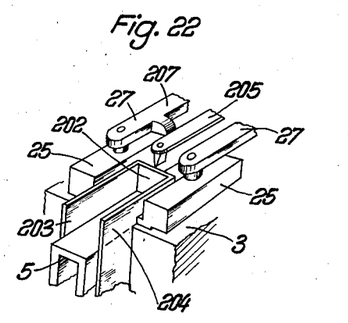
Fig. 22 is a fragmentary perspective view of the parts of Fig. 21 in the position shown in Fig. 21.
Figure 23:
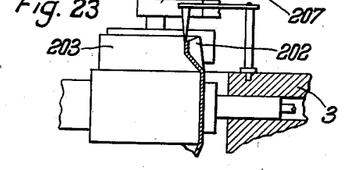
Fig. 23 is a fragmentary, partly sectional, elevational view showing the position which the parts of Fig. 21 assume when the container is in the condition illustrated in Fig. 18.
Figure 24:
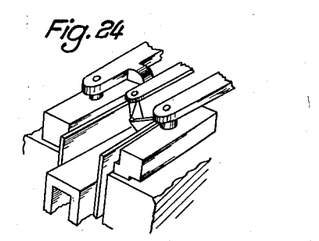
Fig. 24 is a fragmentary perspective illustration of the parts in the position of Fig. 23.
Figure 25:
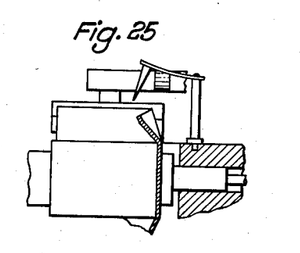
Fig. 25 is a fragmentary, partly sectional, elevational view of the position which the parts of Fig. 21 assume when the container has the condition illustrated in Fig. 19.
Figures 26, 27:
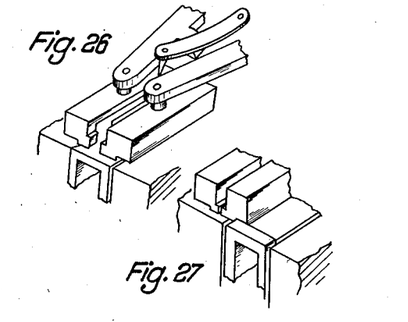
Fig. 26 is a perspective, fragmentary illustration of the parts in the position of Fig. 25.
Fig. 27 is a fragmentary perspective view of the parts when the container has the condition shown in Fig. 20, Fig. 27 showing the parts in the same position as Fig. 6.

As is shown in Figs. 21 and 22, the wheel 3 has a pair of coaxial posts 26 fixed to and extending from its top and bottom faces between each of the pairs of levers 27 and 27' respectively connected to each of the pairs of blocks 25 and 26. These posts 206 respectively carry at their outer free ends elongated leaf springs 205 which extend over and under each folding chamber 4, respectively. At their free ends distant from the posts 206 the leaf springs 205, respectively, carry a pair of pins 201 which are coaxial with each other and which extend toward each other, these pins 201 each having a substantially pointed free end distant from the spring 205. Furthermore, each of the levers 27' is provided with a lateral camming projection 207 extending toward the leaf spring 205 for engaging the latter and bending the same away from the folding chamber 4 (Figs. 25 and 26) for a purpose described below.

Figure 28:
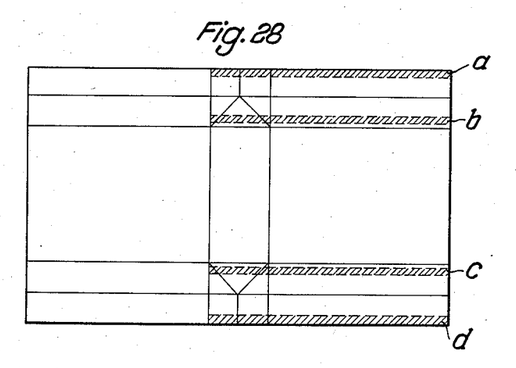
Fig. 28 is a developed view of a sheet material portion which is formed into a container according to the present invention, Fig. 28 indicating the fold lines as well as the location of strips of adhesive material.

A strip portion from which a container is made according to the present invention is shown in a developed view in Fig. 28 which also shows the fold lines. The strip portion may be made from any suitable paper or the like which is provided on its face opposed to that which is visible in Fig. 28 with a pair of elongated coatings of any suitable plastic which will fuse under relatively low heat and pressure. These plastic coatings are located along the top and bottom edges of the strip as viewed in Fig. 28. Furthermore, the strip is provided at its face which is visible in Fig. 28 with four elongated narrow coatings a—d of adhesive material of any known type capable of fusing also with the application of a relatively small amount of heat and pressure.

Figure 9:
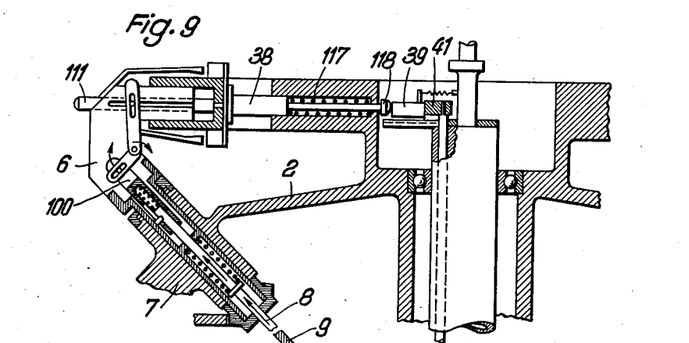
Fig. 9 is a fragmentary view of part of the folding structure of Fig. 1 in a position different from that of Fig. 1.

The above described structure operates as follows:

Elements 2 and 3 are continually rotated about post 1 by any suitable drive (not shown), and these elements turn in the direcion shown by the arrow in Fig. 3. The strip 19 continuously moves tangentially to the periphery of the wheel 3 simply by being pulled from the supply roll. The strip 19 enters between the wheel 3 and the lowermost folding member 5 shown in Fig. 11, this folding member 5 having just been turned back to its horizontal position after the container previously completed was stripped therefrom. The folding member 5 at position I of Fig. 11 has just entered partly into a chamber 4 to grip the strip 19 between itself and the wheel 3. This position of the parts is also indicated in Fig. 9. It will be noted that in this position of the parts the rod 38 engages the stop member 39 to prevent temporarily further inward movement of the folding member 5. With the folding member 5 in the position shown in Fig. 9 where rod 38 engages stop 39 and moves along the latter the two cutting blades 20 on opposite sides of folding member 5 in position I of Fig. 11 move down to cut from the strip 19 a portion thereof which includes the part pressed partly into the chamber 4. By the time the folding member 5 reaches position II of Fig. 11 the strip portion has been cut and the next strip portion is partly pressed into the next chamber 4. Thus, at all times the strip 19 is gripped between elements 5 and 3 and end portions of the strip are successively cut therefrom. The above described photoelectric adjusting structure automatically positions the cam 41 to regulate the extent to which the folding members 5 enter the chambers 4 and thus the lengths cut from the strip 19 are regulated.

Figure 10:
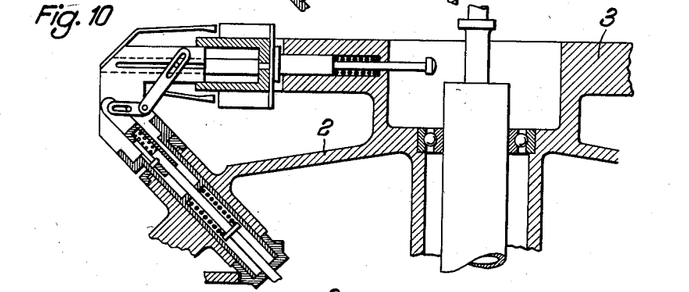
Fig. 10 shows the structure of Fig. 9 in still another position.

During the further turning of the wheel 3 while the above-described operations are taking place with successive chambers 4 and folding members 5 which reach positions I and II shown in Fig. 11, the folding members 5 which have moved beyond position II push the lengths of strip 19 successively into the chambers 4 to the extent indicated in Fig. 10. It should be noted that while the springs 104 are stronger than the springs 38a coiled about the stop rods 38, when these rods engage the stop member 39 the springs 104 are in fact compressed appreciably to take up any play in the parts and to guarantee that the folding members 5 move into the chambers 4 to the desired extent.

Figure 4:
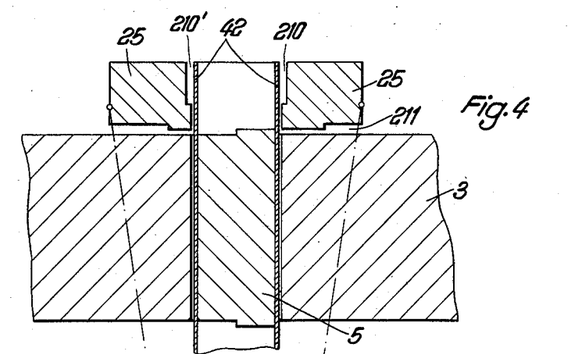
Figs. 4–7 respectively illustrate schematically successive stages in the operation of blocks which join together and fold side edges of the sheet material, the section of Fig. 4 being taken along line A—B of Fig. 2, the section of Fig. 5 being taken along line C—D of Fig. 2, the section of Fig. 6 being taken along line E—F of Fig. 2, and Fig. 7 illustrating the blocks when they have returned to the position of Fig. 4.
Figure 5:
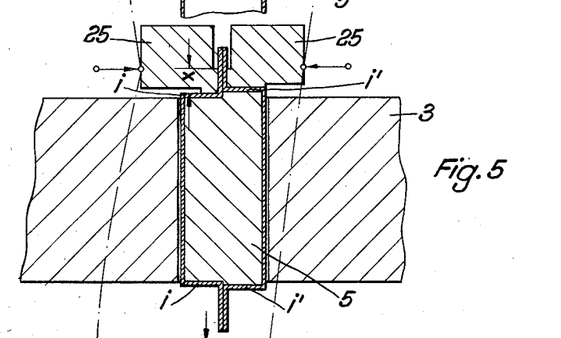
Figures 6, 7:
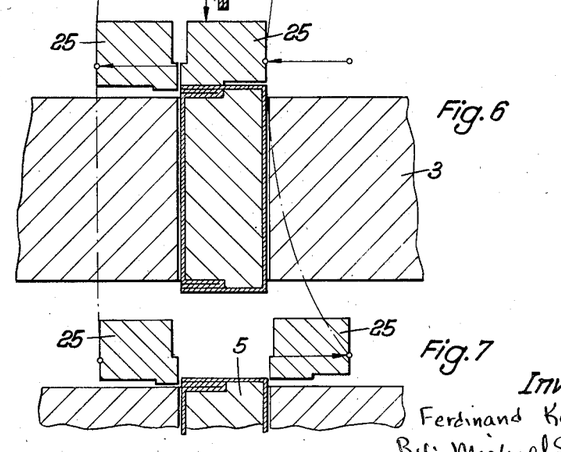

The lengths of strip 19 thus located fully within the folding chambers 4 have free edge portions 42 extending beyond the top and bottom faces of wheel 3, as shown in Fig. 4. At this time the blocks 25 and 26 are actuated with the above-described structure so as to approach each other and move from the position of Fig. 4 to that of Fig. 5, the blocks 26 always being aligned beneath the blocks 25. It will be noted that the left block 25 of Figs. 4-7 is thicker than the right block 25, and the same is true of the blocks 26 not shown in Figs. 4-7 for the sake of convenience. Furthermore, the folding member 5 is provided in its top and bottom faces with shoulders as indicated in Figs. 4-7. Thus, as is evident from Fig. 5, the folds produced by the left blocks 25 and 26, as viewed in Fig. 5, are located nearer to each other than the folds produced by the right blocks. The strip 19 is coated with a plastic or the like, as described above, which causes the side edges of the containers joined to each other in the manner shown in Fig. 5 to adhere to each other as a result of the heat provided by the heating elements of the blocks and the pressure exerted by the blocks. After the blocks reach the position shown in Fig. 5, they then move together to the left to the position shown in Fig. 6, and the right blocks 25 and 26 thus locate the joined portions of the container next to the remainder thereof as shown in Fig. 6. Thereafter, the left blocks 25 and 26 remain in the position of Fig. 6 and the right blocks move to the position shown in Fig. 7, the container now being completed and located on the folding member 5. The solid and dot-dash lines extending across Figs. 4-7 indicates the movement of the blocks.

After the containers are thus formed on the folding members 5, the push rods 8 arrive at a portion of cam 9 which permits the folding members 5 to be withdrawn from the chambers 4 and then the cam 15 produces a turning of the gear sector 11 which causes the folding members 5 to be turned downwardly to their vertical position where the above-described stripping of the containers from the folding members 5 takes place, these folding members passing beneath the strip 19 while they are in their lower vertical position, as was mentioned above.

Figures 12, 13, 13A, 14, 15, 16, 17, 18, 19, 20:
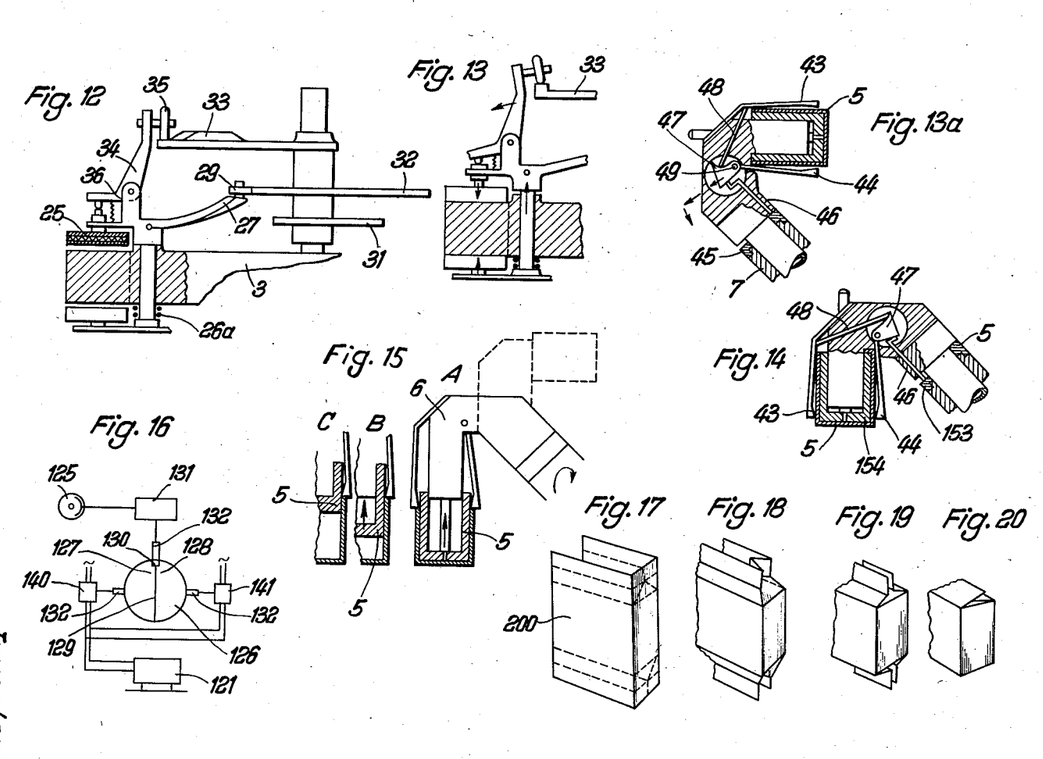
Fig. 12 is a fragmentary, sectional elevational view taken along line G—H of Fig. 2 in the direction of the arrows.
Fig. 13 shows part of the structure of Fig. 12 in a different position.
Fig. 13a is a fragmentary, sectional, elevational view of the stripper structure of the invention in a rest position thereof.
Fig. 14 shows schematically the stripper structure after it has been moved to its operating position.
Fig. 15 is a fragmentary schematic view illustrating successive stages in the operation of the stripper structure.
Fig. 16 is a schematic illustration of part of an automatic control structure for maintaining the parts cut from the strip of sheet material at a given length within given limits.
Figs. 17–20 respectively show in perspective fragmentary views successive stages in the folding of a strip portion into a container.

Referring to Figs. 17–27, it will be seen that when the parts have the position indicated in Figs. 21 and 22 the strip portion 200 will be folded as indicated in Fig. 17, Fig. 17 showing in dotted lines where the strip portion 200 is subsequently folded. As the parts move from the position of Figs. 21 and 22 to that of Figs. 23 and 24, the inner ends 209 of the strip portion are engaged by the pins 201, and the result is inward folding of the strip portion 200 as shown at 202 in Fig. 23, the side portions 203 of the strip 200 which extend above and below the folding member 5 still being unfolded at this time. Then, when the folding member 5 has been moved inwardly toward the axis of wheel 3 to its end position, the above-described structure causes the levers 27 and 27' to move the blocks 25 and 26 associated with each folding chamber 4 toward each other, and the strip 200 then has the condition indicated in Fig. 18. As the levers 27 and 27' approach each other, each camming projection 207 engages a spring 205 to raise and lower the pins 201, respectively, away from the portion 202 of strip 200, and when the pairs of blocks 25 and 26 have the position corresponding to that of Fig. 5, the container is in the condition illustrated in Fig. 19. The blocks 25 and 26 then shift together to the position indicated in Figs. 6 and 27, and the container is in the condition illustrated in Fig. 20. As was described above, the completed container is then stripped from the folding member 5.

As is shown most clearly in Fig. 4, the blocks 25 are provided with faces 210 and 211 which are located inwardly of their outermost face portions adjacent their lower inside corners, as viewed in Fig. 4, and the blocks 26 are constructed in the same way. Thus, when the parts are in the position indicated in Fig. 5, the flaps of the container will be engaged only through the width $x$ indicated in Fig. 5, and the portions $i$ and $i'$ will be engaged by the blocks in the manner indicated in Fig. 5.

Figure 29:
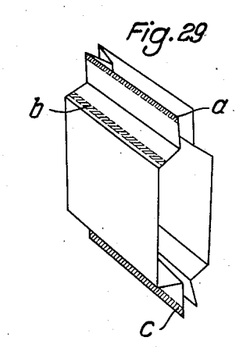
Fig. 29 is a perspective view of the container in the condition of Fig. 18 illustrating the location of the adhesive strips.
Figure 30:
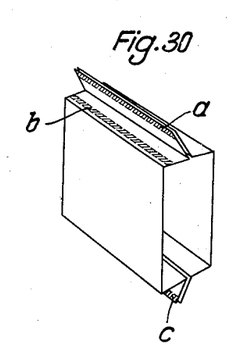
Fig. 30 is a perspective view of the container just before the pairs of adhesive strips are joined to each other.

As is evident from Figs. 29 and 30, the adhesive portions $a$—$d$ are located only at the left side of the container, as viewed in Figs. 4–7, 29 and 30. Thus, when the parts are in the position of Fig. 5, the left block 25 of Fig. 5 will not engage the adhesive portions $a$—$d$, and the same is true of the lower left block 26 which is not illustrated in Fig. 5. Thus, the relatively small heat and pressure applied by the blocks 25 and 26 when they are in position indicated in Fig. 5 will serve only to fuse the adhesive plastic coatings at the inner face of the container to each other, so that the strip portion will be maintained by the fused plastic in the condition indicated in Figs. 5 and 19. As the parts move from the position of Fig. 5 to that of Fig. 6, there is only a momentary engagement between the left blocks 25 and 26 with the adhesive portions $a$—$d$, so that the latter are uninfluenced by these blocks. Then, when the parts are in the position of Fig. 6 the heat and pressure provided by the right blocks 25 and 26 causes the adhesive portion $a$ to become fused with adhesive portion $b$ and the adhesive portion $d$ to become fused with the adhesive portion $c$, as is evident from Figs. 29 and 30. Then the blocks return to the position indicated in Fig. 7 and the completed container is stripped from the folding member in the manner described above.

Thus, it will be seen that with the process and apparatus of the present invention containers made of paper or the like and being open at one end are continuously formed in a rapid precise manner. The containers may be filled with any desired articles and then closed at their top ends.

Although in the example disclosed in the drawings there are sixteen folding chambers in the wheel 3 cooperating with sixteen folding members 5, any desired number of folding chambers and folding members may be provided.

It will be understood that each of the elements described above, or two or more together, may also find a useful application in other types of container manufacturing process and apparatus differing from the types described above.

While the invention has been illustrated and described as embodied in continuous container manufacturing process and apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process for continually manufacturing containers from a strip of sheet material comprising the steps of moving with a folding member a continuous, uncut portion of the strip partly into a folding chamber; cutting from the strip a part thereof which includes the strip portion located in the chamber and which has free opposed continuous side edges; moving the thus cut part of the strip with the folding member further into the chamber; joining each of said free side edges of the strip continuously upon itself to form an enclosure in which said folding member is located; folding the thus joined side edges against the remainder of the container; removing the folding member with the thus formed container thereon from the folding chamber; and stripping the thus formed container from said folding member.

2. In an apparatus for continuously making containers from a strip of sheet material, in combination, support means; means forming a plurality of folding chambers carried by said support means for continuously moving the folding chambers successively along an endless path, a plurality of folding members equal in number to the number of folding chambers respectively located adjacent the latter and carried by said support means, respectively; a plurality of pairs of folding block means also carried by said support means respectively adjacent said chambers for first closing and joining upon itself each of a pair of side edges of a strip portion in each chamber and then folding the joined side edges against the remainder of the strip portion; and control means carried by said support means and operatively connected to said folding members and block means for moving said folding members in a given sequence into and out of said chambers and for moving each pair of said block means at a given time during the movement of said folding members first toward each other for closing and joining said side edges upon themselves and then together laterally across each chamber for folding the joined side edges against the remainder of the strip portion.

3. In an apparatus for making containers from a strip of sheet material, in combination, support means; a wheel carried for turning movement about its axis by said support means, said wheel being formed in its outer periphery with a plurality of folding chambers distributed about the axis of said wheel; a plurality of folding members respectively located adjacent said folding chambers for movement into and out of the same; a plurality of carrier means respectively carrying said folding members and respectively carried by said support means for turning movement about a plurality of axes which make an angle of substantially 45° with said wheel axis; means operatively connected to said folding members for moving the same into and out of said chambers in a given sequence; and means operatively connected to said plurality of carrier means for turning the latter respectively about said plurality of axes in a given sequence to move said folding members between positions respectively adjacent and distant from said chambers.

4. In an apparatus for making containers from a strip of sheet material, in combination, support means; a wheel carried for turning movement about its axis by said support means, said wheel being formed in its outer periphery with a plurality of folding chambers distributed about the axis of said wheel; an annular member fixed to said wheel for turning movement therewith; a plurality of folding members respectively located adjacent said folding chambers for movement into and out of the same; a plurality of carrier means respectively carrying said folding members and respectively carried by said annular member for turning movement about a plurality of axes which make an angle of substantially 45° with said wheel axis; means operatively connected to said folding members for moving the same into and out of said chambers in a given sequence; and means operatively connected to said plurality of carrier means for turning the latter respectively about said plurality of axes in a given sequence to move said folding members between positions respectively adjacent and distant from said chambers.

5. In an appartus for continuously making containers from a strip of sheet material, in combination, support means; means forming a plurality of folding chambers carried by said support means for continuously moving the folding chambers successively along a circular path; a plurality of cutting means respectively located between pairs of successive folding chambers for cutting a strip of sheet material; a plurality of folding members equal in number to the number of folding chambers respectively located adjacent the latter and carried by said support means for movement into and out of said chambers, respectively; a plurality of pairs of folding block means also carried by said support means respectively adjacent said chambers for first closing and joining upon itself each of a pair of side edges of a strip portion in each chamber and then folding the joined side edges against the remainder of the strip portion; and control means carried by said support means and operatively connected to said folding members and block means for moving said folding members in a given sequence into and out of said chambers and for moving each pair of said block means at a given time during the movement of said folding members first toward each other for closing and joining said side edges upon themselves and then together laterally across each chamber for folding the joined side edges against the remainder of the strip portion.

6. In an apparatus as recited in claim 5, each of said cutting means including an elongated rod parallel to the axis of said circular path guided for axial shifting movement by said folding chamber forming means; a cutting blade fixed to said rod for movement therewith; and cam means operatively engaging said rods for axially shifting the same in a given sequence.

7. In an apparatus for making containers from a strip of sheet material, in combination, support means; a wheel carried for turning movement about its axis by said support means, said wheel being formed in its outer periphery with a plurality of folding chambers distributed about the axis of said wheel; a plurality of folding members respectively located adjacent said folding chambers for movement into and out of the same; a plurality of carrier means respectively carrying said folding members and respectively carried by said support means for turning movement about a plurality of axes which make an angle of substantially 45° with said wheel axis; a plurality of cutting means carried by said wheel and respectively located between pairs of successive folding chambers for cutting a strip; means, including a first cam carried by said support means, operatively connected to said folding members for moving the same into and out of said chambers in a given sequence; means, including a second cam carried by said support means, for actuating said plurality of cutting means in a given sequence; and means, including a third cam carried by said support means, operatively connected to said plurality of carrier means for turning the latter respectively about said plurality of axes in a given sequence to move said folding members between positions respectively adjacent and distant from said chambers.

8. In an apparatus for making containers from a strip of sheet material, in combination, support means; a wheel carried for turning movement about its axis by said support means, said wheel being formed in its outer periphery with a plurality of folding chambers distributed about the axis of said wheel; an annular skirt member extending from said wheel and fixed thereto for turning movement therewith; a plurality of folding members respectively located adjacent said folding chambers for movement into and out of the same; a plurality of carrier means respectively carrying said folding members and respectively carried by said annular member for turning movement about a plurality of axes which make an angle of substantially 45° with said wheel axis; a plurality of cutting means carried by said wheel and respectively located between pairs of successive folding chambers for cutting a strip; means, including a first cam carried by said support means and covered by said skirt member, operatively connected to said folding members for moving the same into and out of said chambers in a given sequence; means, including a second cam carried by said support means and covered by said skirt member, for actuating said plurality of cutting means in a given sequence; and means, including a third cam carried by said support means and covered by said skirt member, operatively connected to said plurality of carrier means for turning the latter respectively about said plurality of axes in a given sequence to move said folding members between positions respectively adjacent and distant from said chambers.

9. In an apparatus for making containers from a strip of sheet material, in combination, support means; a wheel carried for turning movement about its axis by said support means, said wheel being formed in its outer periphery with a plurality of folding chambers distributed about the axis of said wheel, said wheel axis being substantially vertical; an annular member fixed to said wheel for turning movement therewith and extending downwardly therefrom; a plurality of folding members respectively located adjacent said folding chambers for movement into and out of the same; a plurality of carrier means respectively carrying said folding members and respectively carried by said annular member for turning movement about a plurality of axes which make an angle of substantially 45° with said wheel axis; means operatively connected to said folding members for moving the same into and out of said chambers in a given sequence; and means operatively connected to said plurality of carrier means for turning the latter respectively about said plurality of axes in a given sequence to move said folding members between positions respectively adjacent and distant from said chambers.

10. In an apparatus for making containers from a strip of sheet material, in combination, support means; a wheel carried for turning movement about its axis by said support means, said wheel being formed in its outer periphery with a plurality of folding chambers distributed about the axis of said wheel; a plurality of folding members respectively located adjacent said folding chambers for movement into and out of the same; a plurality of carrier means respectively carrying said folding members and respectively carried by said support means for turning movement about plurality of axes which make an angle of substantially 45° with said wheel axis; means operatively connected to said folding members for moving the same into and out of said chambers in a given sequence; means operatively connected to said plurality of carrier means for turning the latter respectively about said plurality of axes in a given sequence to move said folding members between positions respectively adjacent and distant from said chambers; a pair of stripper arms located adjacent each folding member and carried by each carrier means; and control means operatively connected to said stripper arms for moving the latter to and from a stripping position where they are adapted to strip a container from each folding member, said control means including a cam carried by each of said carrier means.

11. In an apparatus for making containers from a strip of sheet material, in combination, support means; a wheel carried for turning movement about its axis by said support means, said wheel being formed in its outer periphery with a plurality of folding chambers distributed about the axis of said wheel; a plurality of folding members respectively located adjacent said folding chambers for movement into and out of the same; a plurality of carrier means respectively carrying said folding members and respectively carried by said support means for turning movement about a plurality of axes which make an angle of substantially 45° with said wheel axis; means operatively connected to said folding members for moving the same into and out of said chambers in a given sequence and including a push rod slidably carried by each of said carrier means and a cam engaging said push rod; and means operatively connected to said plurality of carrier means for turning the latter respectively about said plurality of axes in a given sequence to move said folding members between positions respectively adjacent and distant from said chambers.

12. A process for continually manufacturing containers from a strip of sheet material comprising the steps of feeding the strip tangentially to a folding chamber; moving with a folding member a continuous, uncut portion of the strip partly into the folding chamber, said strip portion having an intermediate part engaged by an end face of said folding member; cutting from the strip a part thereof which includes the strip portion located in the chamber and which has a pair of opposed continuous free side edges; moving the thus cut part of the strip with the folding member further into the chamber; joining each of said free side edges of the strip upon itself from its intermediate part to the end portion of the strip opposite its intermediate part to form an enlcosure in which said folding member is located; folding the thus joined side edges against the remainder of the container; removing the folding member with the thus formed container thereon from the folding chamber; and stripping the thus formed container from said folding member.

13. In an apparatus for making containers from a strip of sheet material, in combination, support means; a wheel carried for turning movement about its axis by said support means, said wheel being formed in its outer periphery with a plurality of folding chambers distributed about the axis of said wheel; a plurality of folding members respectively located adjacent said folding chambers for movement into and out of the same; limiting means carried by said wheel for temporarily limiting the extent to which the folding members respectively extend into said folding chambers; a plurality of carrier means respectively carrying said folding members and respectively carried by said support means for turning movement about a plurality of axes which make an angle of substantially 45° with said wheel axis; means operatively connected to said folding members for moving the same into and out of said chambers in a given sequence; and means operatively connected to said plurality of carrier means for turning the latter respectively about said plurality of axes in a given sequence to move said folding members between positions respectively adjacent and distant from said chambers.

14. In an apparatus as defined in claim 13, said limiting means including a plurality of rods respectively carried by said wheel for movement into and out of said chambers in opposition to said folding members, and a stop member successively engaging said rods to limit the movement thereof out of said chambers temporarily.

15. A process for continually manufacturing containers from a strip of sheet material, comprising the steps of moving with a folding member a portion of the strip partly into a folding chamber; cutting from the strip a part thereof which includes the strip portion located in the chamber and which has opposed continuous free side edges; moving the thus cut part of the strip with the folding member further into the chamber; joining and closing each of said free side edges of the strip continuously upon itself to form an enclosure in which said folding member is located; folding the thus joined side edges against and joining the same to the remainder of the container; removing the folding member with the thus formed container thereon from the folding chamber; and stripping the thus formed container from said folding member.

16. In a process for continually manufacturing containers from a strip of sheet material, the steps of moving with a folding member a strip portion which has opposed continuous free side edges into a folding chamber; closing and joining each of said free side edges upon itself to form an enclosure in which said folding member is located; folding the thus closed and joined side edges against the remainder of the strip portion; removing the folding member with the thus formed container thereon from the folding chamber; and then stripping the container from the folding member.

17. In an apparatus for continuously making containers from a strip of sheet material, in combination, support means; folding chamber means carried by said support means and having a plurality of folding chambers each of which is open at its opposed sides; a pair of folding block means located at each of said open sides of each folding chamber for first closing and joining upon itself while the block means of each pair move toward each other a free side edge of a strip portion located in each chamber and for them folding the joined side edge against the remainder of the strip portion while each pair of block means moves laterally across the open side of each chamber; and control means carried by said support means and operatively connected to said pairs of block means for moving each pair of block means first toward each other and then together across the open side of each chamber.

References Cited in the file of this patent
UNITED STATES PATENTS
149,389    Gates __________________ Apr. 7, 1874